(12) United States Patent
Finnestad (10) Patent No.: US 9,187,014 B2
(45) Date of Patent: Nov. 17, 2015

(54) ADJUSTABLE FOOT FOR AN INFANT CAR SEAT BASE

(71) Applicant: Goodbaby Child Product Co., Ltd., Kunshan (CN)

(72) Inventor: Mark Brian Finnestad, Franklin, MA (US)

(73) Assignee: Goodbaby Child Product Co., Ltd., Kunshan (CN)

( * ) Notice: Subject to any disclaimer, the term of this patent is extended or adjusted under 35 U.S.C. 154(b) by 0 days.

(21) Appl. No.: 14/515,656

(22) Filed: Oct. 16, 2014

(65) Prior Publication Data

US 2015/0108312 A1    Apr. 23, 2015

Related U.S. Application Data

(60) Provisional application No. 61/894,063, filed on Oct. 22, 2013.

(51) Int. Cl.
*A47C 1/08* (2006.01)
*B60N 2/28* (2006.01)
*B60N 2/26* (2006.01)

(52) U.S. Cl.
CPC .............. *B60N 2/2821* (2013.01); *B60N 2/265* (2013.01); *B60N 2/2875* (2013.01)

(58) Field of Classification Search
CPC .... B60N 2/2821; B60N 2/2875; B60N 2/265; B60N 2002/022; B60N 2/3061; B60N 2/443; B60N 2/1645; B60N 2/2863; B60N 2/286; B60N 2/2806
USPC ...................................... 248/677; 297/256.13
See application file for complete search history.

(56) References Cited

U.S. PATENT DOCUMENTS

| 5,836,650 | A | * | 11/1998 | Warner et al. ............. 297/256.11 |
| 6,318,799 | B1 | * | 11/2001 | Greger et al. ............. 297/256.13 |
| 6,428,099 | B1 | | 8/2002 | Kain |
| 6,705,676 | B1 | * | 3/2004 | Berringer et al. ........ 297/256.16 |
| 7,207,628 | B2 | * | 4/2007 | Eros ............................... 297/297 |
| 7,246,855 | B2 | | 7/2007 | Langmaid et al. |
| 7,597,396 | B2 | | 10/2009 | Longenecker et al. |
| 7,658,446 | B2 | | 2/2010 | Meeker et al. |
| 7,748,782 | B2 | | 7/2010 | Chen et al. |
| 7,789,402 | B2 | | 9/2010 | Saville et al. |
| 8,186,757 | B2 | | 5/2012 | Duncan et al. |

(Continued)

OTHER PUBLICATIONS

International Search Report and Written Opinion mailed Feb. 4, 2015 in corresponding PCT application No. PCT/US2014/061296.

*Primary Examiner* — Patrick Maestri
(74) *Attorney, Agent, or Firm* — Nields, Lemack & Frame, LLC (57) ABSTRACT

A novel infant child restraint system includes a base for an infant safety seat that has a height adjustment to allow the base to assume one of a plurality of positions when mounted to the vehicle seat. In one embodiment, a base for an infant safety seat features a height adjustment assembly that includes a release knob accessible from a top surface, a shaft having a first end that is attached to a release knob, a first retaining member disposed on the shaft, and an adjustable foot adapted to be disposed in a cavity and having a locking member on an inner surface. The shaft has a locked position, wherein the first retaining member cooperates with the locking member to hold the adjustable foot in a first height position, and a second, unlocked position where the first retaining member does not contact the locking member.

19 Claims, 8 Drawing Sheets

(56) References Cited

U.S. PATENT DOCUMENTS

| | | |
|---|---|---|
| 8,353,559 B2 | 1/2013 | Williams et al. |
| 2011/0193382 A1* | 8/2011 | Gaudreau et al. ........ 297/256.13 |
| 2013/0043706 A1 | 2/2013 | Gaudreau, Jr. |
| 2013/0088057 A1 | 4/2013 | Szakelyhidi et al. |

* cited by examiner

ADJUSTABLE FOOT FOR AN INFANT CAR SEAT BASE

CROSS-REFERENCE TO RELATED APPLICATIONS

The present disclosure claims priority to U.S. Provisional Patent Application Ser. No. 61/894,063, entitled "Adjustable Foot for an Infant Car Seat Base" and filed on Oct. 22, 2013, the disclosure of which is incorporated herein by reference.

FIELD OF THE DISCLOSURE

The present disclosure generally relates to devices or mechanisms that adjust the inclination or height of a car seat base. Specifically, the present disclosure relates to an adjustable foot for an infant car seat base.

BACKGROUND

Child restraint systems are well known in the art, and are designed to protect children from injury or death during collisions. The design of child restraint systems typically vary depending on the age and relative size of the child. For example, children under 4 feet, 9 inches tall may require the use of a simple booster seat until they are large enough to use an adult seat belt. Infant safety seats typically have more components, and place an infant in a rearward-facing, semi-recumbent position.

Typically, an infant safety seat is made up of two components: a car seat carrier, and a base into which the car seat carrier is mounted. The base is positioned on the seat of a vehicle, such as a car, truck, train, or airplane, and secured using the restraint system of the vehicle, or a latch system. For example, a base is typically secured in place on an automobile seat through the use of the vehicle's seat belt or a LATCH (Lower Anchor and Tethers for CHildren) system.

The car seat carrier is then attached to the base, typically using one or more connection points. This allows the base to be left secured to the vehicle seat, while only the carrier is removed. To provide maximum protection to the infant, the carrier is typically oriented such that when the infant is properly placed in the carrier, the infant's feet are nearest the seat back.

There are a number of issues associated with each of these two components. One such issue is the variation in slope and position of the vehicle seat onto which the base is placed. For example, some vehicle seats are horizontal, or nearly horizontal. Others, however, are much more sloped. Typically, the inner portion of the seat, where it meets the seat back, will be at a lower height than the outer portion of the seat, where the child's legs hang from. Therefore, the base, unless it has an adjustment, is positioned at different inclinations, based on the vehicle's seat. These differences in inclination cause the infant car seat to also be at different inclinations, some of which may not offer sufficient protection and comfort for the infant. Height adjustments within the base can be used to minimize this issue.

Currently, some of these issues are addressed in a variety of ways, with varying degrees of success. In some cases, the solutions to these issues are expensive, thereby raising the price of the infant safety seat. It would be beneficial if these issues could be addressed in a safe, convenient and cost effective manner.

SUMMARY

The problems of the prior art are addressed by a novel infant safety seat. The infant safety seat includes a base having a height adjustment to allow the base to assume one of a plurality of positions and inclinations when mounted to the vehicle seat. Accordingly, in one example, the problem of adjusting the inclination or height of a base of an infant safety seat may be solved by an adjustable foot formed in an exterior surface of the base and in communication with an actuator configured to releasably engage the adjustable foot.

In one embodiment, a base for an infant safety seat has a height adjustment to allow the base to assume one of a plurality of positions and inclinations when mounted to the vehicle seat. In one embodiment, a base for an infant safety seat includes a base plate having a top surface and an underside adapted to face toward a vehicle seat. A cavity is disposed in the underside. The base plate further features a height adjustment assembly that includes a release knob accessible from the top surface, a shaft having a first end that is attached to the release knob, a first retaining member disposed on the shaft, and an adjustable foot adapted to be disposed in the cavity and having a locking member on an inner surface. The shaft has a locked position, wherein the first retaining member cooperates with the locking member to hold the adjustable foot in a first height position, and a second, unlocked position where the first retaining member does not contact the locking member.

In another embodiment, the base further includes one or more additional locking members disposed on the inner surface, such that the locking members allow the foot to be held in a variety of height positions. In another embodiment, the base may include one or more additional first retaining members disposed on the shaft, such that the first retaining members allow the foot to be held in a variety of height positions. In another embodiment, the base further includes a second retaining member disposed on the shaft, such that a blocking member and the second retaining member cooperate to retain the foot on the base.

In yet another embodiment, the base further includes a mounting frame affixed to the underside of the base plate. The mounting frame includes a passageway, through which the shaft passes. Further, the mounting frame may include a front wall, such that a wall of the adjustable foot is disposed in a gap between a wall on the underside of the base plate and the front wall. The front wall may further include a guide mechanism to allow the foot move within the gap. In some embodiments, the guide mechanism is a vertical recess, and the foot includes a rail that is adapted to fit within the recess. Additionally, the base may include a biasing member, such as a spring, on the shaft. The biasing member is configured to bias the shaft to the locked position.

In still another embodiment, a base for an infant safety seat includes an upper surface adapted to carry a car seat carrier and a lower surface adapted to be placed on a vehicle car seat, and a height adjustment assembly. The height adjustment assembly includes a height adjustment rack, an actuator, a release button accessible from the upper surface, and an adjustable foot that extends from the lower surface. The actuator releasably engages the height adjustment rack at different vertical locations along the height adjustment rack, such that the adjustable foot may move with respect to the lower surface of the base.

In some embodiments, the actuator is in communication with the release button, and rotating the release button may cause the actuator to releasably engage the height adjustment rack at different vertical locations along the height adjustment rack. The height adjustment rack may include one or more locking members, and the actuator may include a retaining member that releasably engages with at least one of the one or more locking members. In some embodiments, the height adjustment rack is formed on an inner surface of the adjustable foot. In other embodiments, the actuator includes a shaft having one or more retaining members configured to releasably engage with the height adjustment rack.

In other embodiments, the height adjustment assembly may be disposed at least in part within a cavity in the lower surface of the base. The height adjustment assembly may further include a biasing member in communication with the actuator, such that the biasing member biases the actuator to be engaged with the height adjustment rack. In other embodiments, the adjustable foot is prevented from disengaging from the height adjustment mechanism by a blocking member in communication with a second retaining member. In still other embodiments, the height adjustment assembly includes a guiding mechanism that is configured to allow the adjustable foot to move with respect to the lower surface of the base along a single plane.

In yet another embodiment, a base for an infant safety seat includes an upper surface adapted to carry a car seat carrier, a lower surface adapted to be placed on a vehicle car seat, and a height adjustment assembly. The lower surface includes a cavity, and the height adjustment assembly is disposed at least in part within the cavity. The height adjustment assembly includes an adjustable foot extending from the lower surface. The adjustable foot includes a height adjustment rack that includes a plurality of locking members. The height adjustment assembly further includes an actuator having a shaft. The shaft has one or more retaining members. A release button is coupled to the actuator and accessible from the upper surface. Rotating the release button causes the one or more retaining members to releasably engage with at least one of the plurality of locking members at different vertical locations along the height adjustment rack, such that the location of the adjustable foot with respect to the lower surface may be adjusted and locked in place.

BRIEF DESCRIPTION OF THE DRAWINGS

For a better understanding of the present disclosure, reference is made to the accompanying drawings, which are incorporated herein by reference and in which.

DETAILED DESCRIPTION OF THE DISCLOSURE

Figure 1:
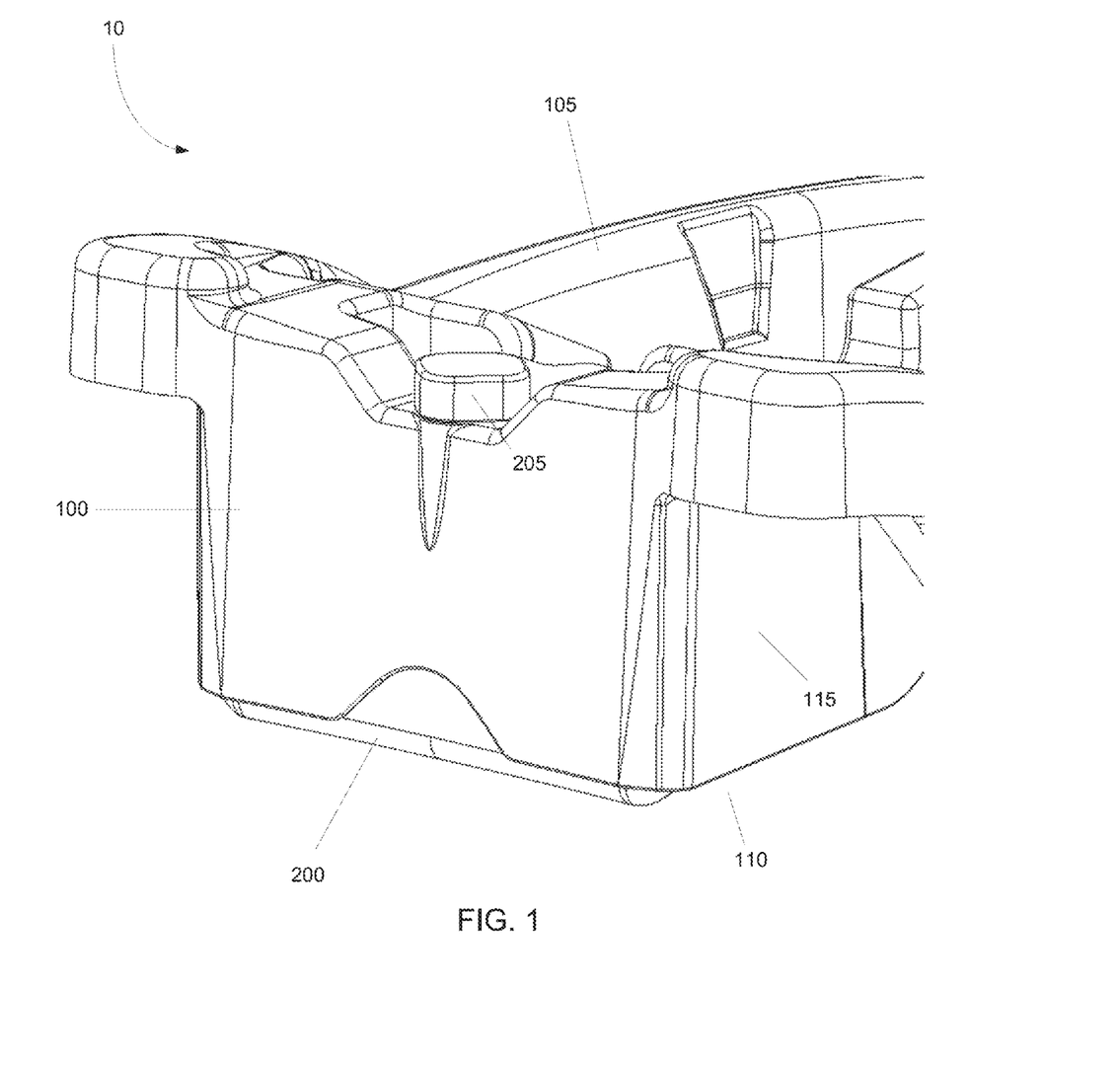
FIG. 1 is a perspective view of the base according to one embodiment.

FIG. 1 shows a view of a base 10 of an infant safety seat in accordance with one embodiment of the disclosure. The base 10 comprises a base plate 100 and a height adjustment assembly 200. The base plate 100 may be formed to have two opposite ends, one configured for an infant's head, and the opposite end configured for an infant's feet. The two edges perpendicular to the ends are referred to as sides 115. The base plate 100 further comprises an upper or top surface 105 adapted to receive a car seat carrier, and an underside or lower surface 110 adapted to be secured to the seat of a vehicle. In one embodiment, the base plate 100 is a single molded plastic part, which may be made from polypropylene or other plastic. Similarly, the height adjustment assembly 200 may be made from similar materials. The height adjustment assembly 200 may be disposed in a cavity located on the underside or lower surface 110 of the base plate 100.

Figure 2:
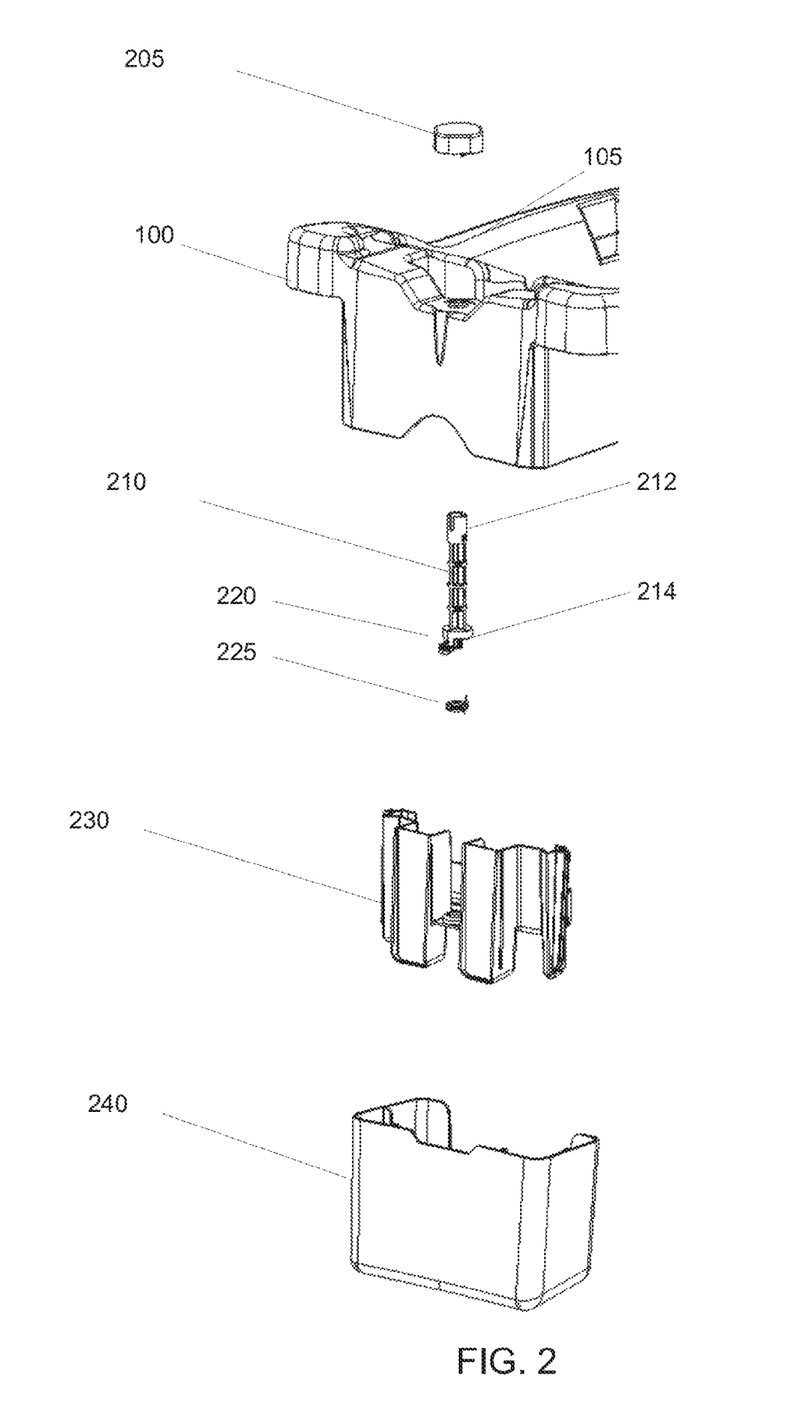
FIG. 2 is an exploded view of the adjustable height assembly according to one embodiment.

FIG. 2 shows an exploded view of the height adjustment assembly 200, showing each of the components that make up this embodiment of the height adjustment assembly 200. The height adjustment assembly 200 comprises a release button or release knob 205. As shown in FIG. 1, the release knob 205 is disposed on the top surface 105 of the base plate 100, so as to be conveniently accessible by the user. The release knob 205 is in communication with an actuator that releasably engages an adjustable foot 240, thus allowing the adjustable foot 240 to be moved upwards or downwards with respect to the base 10. In this embodiment, the release knob 205 is rotated to cause the actuator to releasably engage the adjustable foot 240. However, in other embodiments, the release knob 205 may be pressed down, pulled, or otherwise manipulated.

Figure 4A:
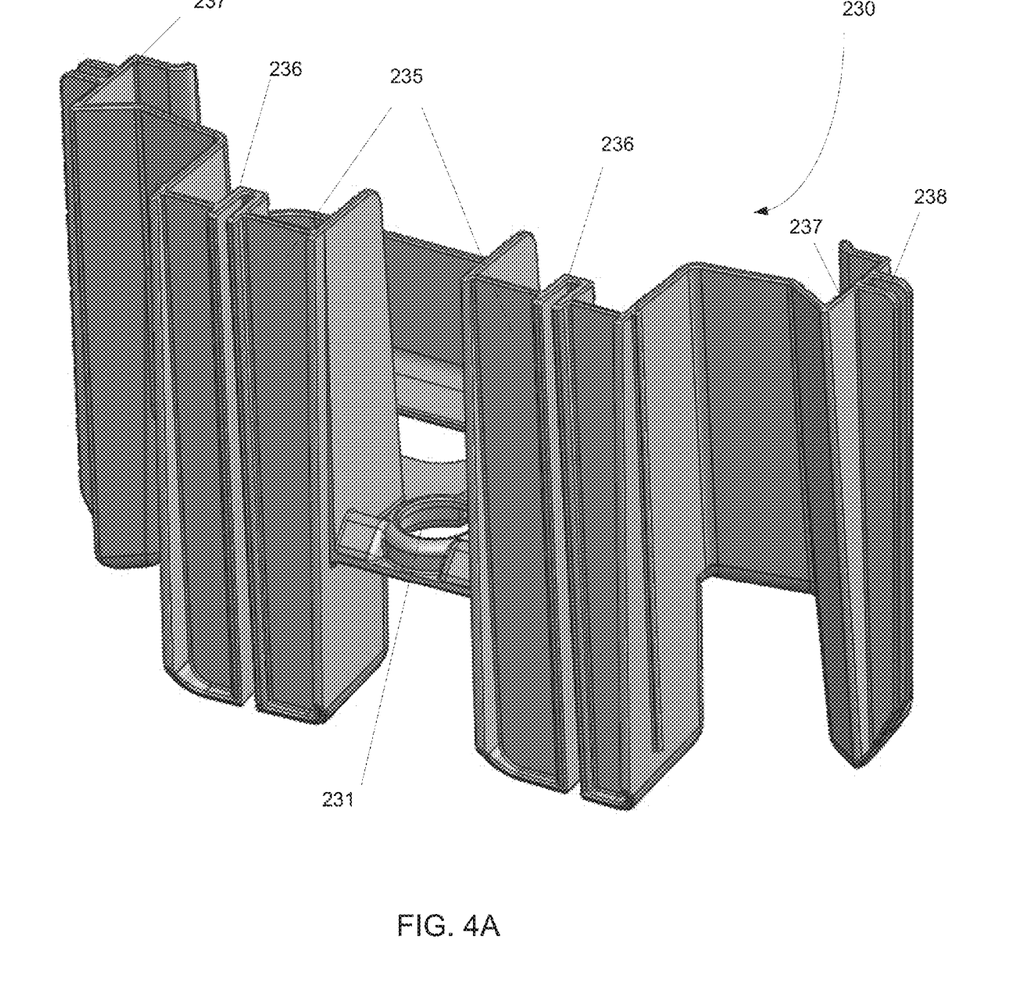
FIGS. 4A-4B show different views of the mounting frame.

As shown in FIG. 2, in this embodiment, the actuator comprises a shaft 210. The shaft 210 has a proximal end 212, which attaches to the release knob 205, and a distal end 214. The distal end 214 may include one or more retaining members 220, which cooperate with an adjustable foot 240 to hold the adjustable foot 240 in place. A biasing member 225, such as a spring, is disposed near the distal end 214 of the shaft 210. A mounting frame 230 may be disposed within the underside of the base plate 100 and is used to provide a passageway 231 (as shown in FIG. 4A) through which the shaft 210 may pass.

As shown in FIG. 2, the height adjustment assembly 200 includes an adjustable foot 240. When the base 10 is placed on the rear seat of a vehicle, the adjustable foot 240 is in contact with the top surface 105 of the vehicle seat. The adjustable foot 240 is configured to slide in and out of the underside of the base plate 100 such that it varies the height of the base 10 with respect to the vehicle seat.

Figure 3:
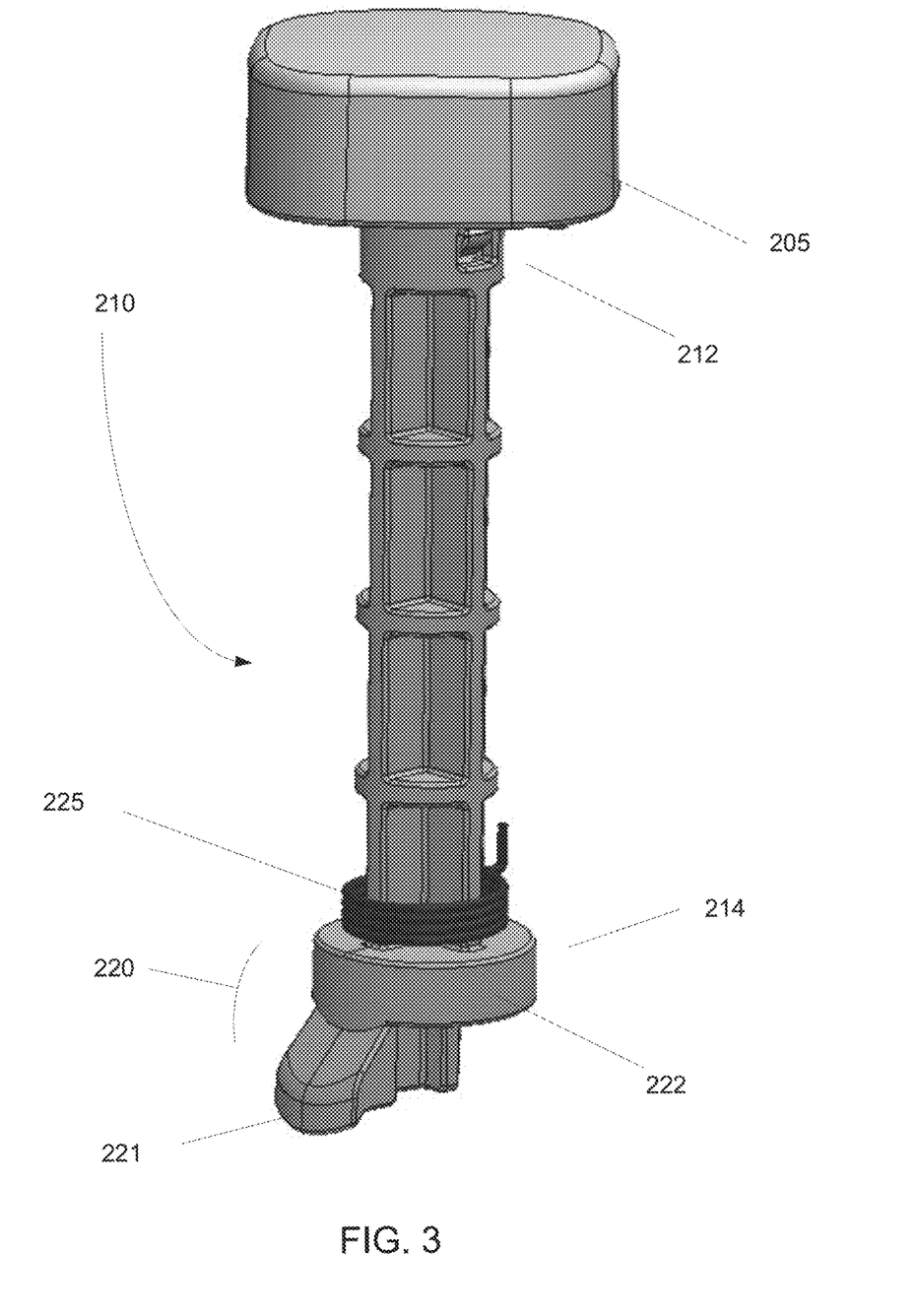
FIG. 3 shows a view of the shaft according to one embodiment.
Figure 5:
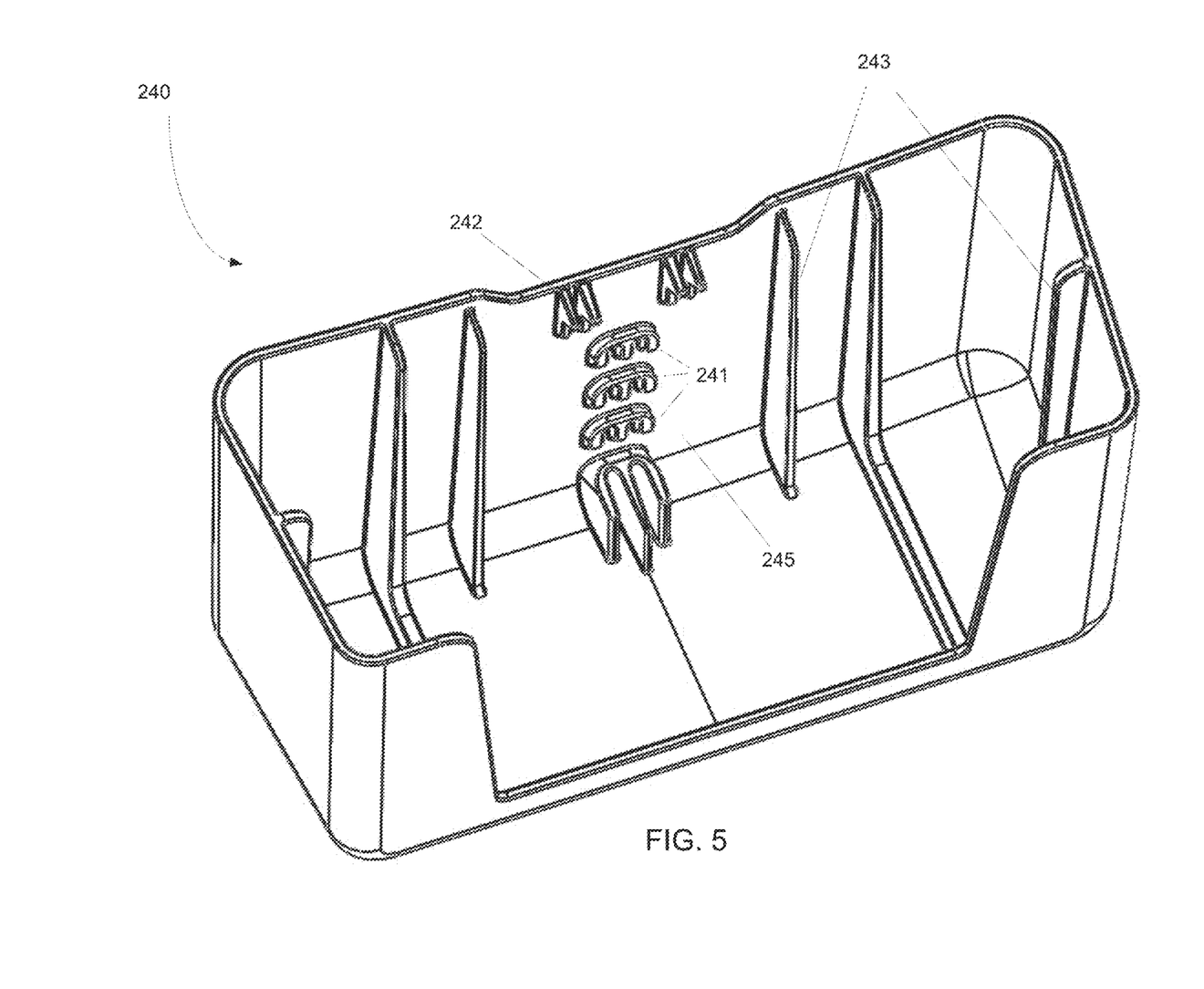
FIG. 5 shows a view of the inner surface of the adjustable foot.

FIG. 3 shows an enlarged view of the shaft 210. As described above, the proximal end 212 end of the shaft 210 is attached to the release knob 205, such as by gluing, welding, screwing, fitting, or other suitable means. The distal end 214 of the shaft 210 includes one or more retaining members 220. In this embodiment, the one or more retaining members 220 comprise a first retaining member 221, which may be a protruding end. The first retaining member 221 is not symmetrical about the center axis of the shaft 210. In other words, the first retaining member 221 extends from only a portion of the distal end 214 of the shaft 210. Thus, when the release knob 205 is turned to a first, or locked, position, the first retaining member 221 engages with at least one of the locking members 241 in the adjustable foot 240, as shown in FIG. 5. However, when the release knob 205 is rotated to a second, or unlocked position, the first retaining member 221 does not engage with any of the locking members 241 of the adjustable foot 240.

The one or more retaining members 220 on the distal end 214 may also comprise a second retaining member 222, which may be a concentric ring disposed above the first retaining member 221. In one embodiment, the second retaining member 222 is an integral part of the shaft 210. In other embodiments, the second retaining member 222 may be a washer or other like device. Unlike the first retaining member 221, the second retaining member 222 is symmetrical about the axis of the shaft 210. This second retaining member 222 may cooperate with a blocking member 242 (as shown in FIG. 5) on the adjustable foot 240 to retain the adjustable foot 240 in the base plate 100, as described in further detail below. Although the second retaining member 222 is shown, in some embodiments, the second retaining member 222 may not be present. Further, in other embodiments, the second retaining member 222 may be disposed at a different location on the shaft 210 or within the height adjustment assembly 200.

In some embodiments, a biasing member 225, such as a spring, is disposed about the central axis of shaft 210. This biasing member 225 is configured so as to return the release knob 205 and the shaft 210 to the first, or locked, position. The biasing member 225 may be fixed at one end to the shaft 210. For example, in one embodiment, one end of the biasing member 225 is inserted into a hole disposed in the second retaining member 222. The opposite end of the biasing member 225 may be coupled to the passageway 231 (as shown in FIG. 4A) in the mounting frame 230. For example, in some embodiments, openings may exist in the shaft 210 and the mounting frame 230. The opposite ends of the biasing member 225 may be inserted into a respective one of these openings. In this way, rotation of the shaft 210 relative to the passageway 231 causes the biasing member 225 to be extended or stretched. When the release knob 205 is released, the biasing member 225 contracts to its nominal shape, thereby causing the shaft 210 to rotate in the opposite direction.

In other embodiments, a biasing member 225 is not used. In these embodiments, the user may manually rotate the release knob 205 and the shaft 210 to the second, or unlocked, position. The user then adjusts the adjustable foot 240, for example, by lifting the base 10 such that gravity causes the adjustable foot 240 to fall downwards towards the vehicle seat. Alternately, the user may manually adjust the adjustable foot 240 (e.g., by pulling or pushing). After moving the adjustable foot 240 to a desired position, the user then manually rotates the release knob 205 back to its first, or locked, position. Once the height adjustment assembly 200 is locked, the user may then secure a car seat carrier to the base 10.

Figure 4B:
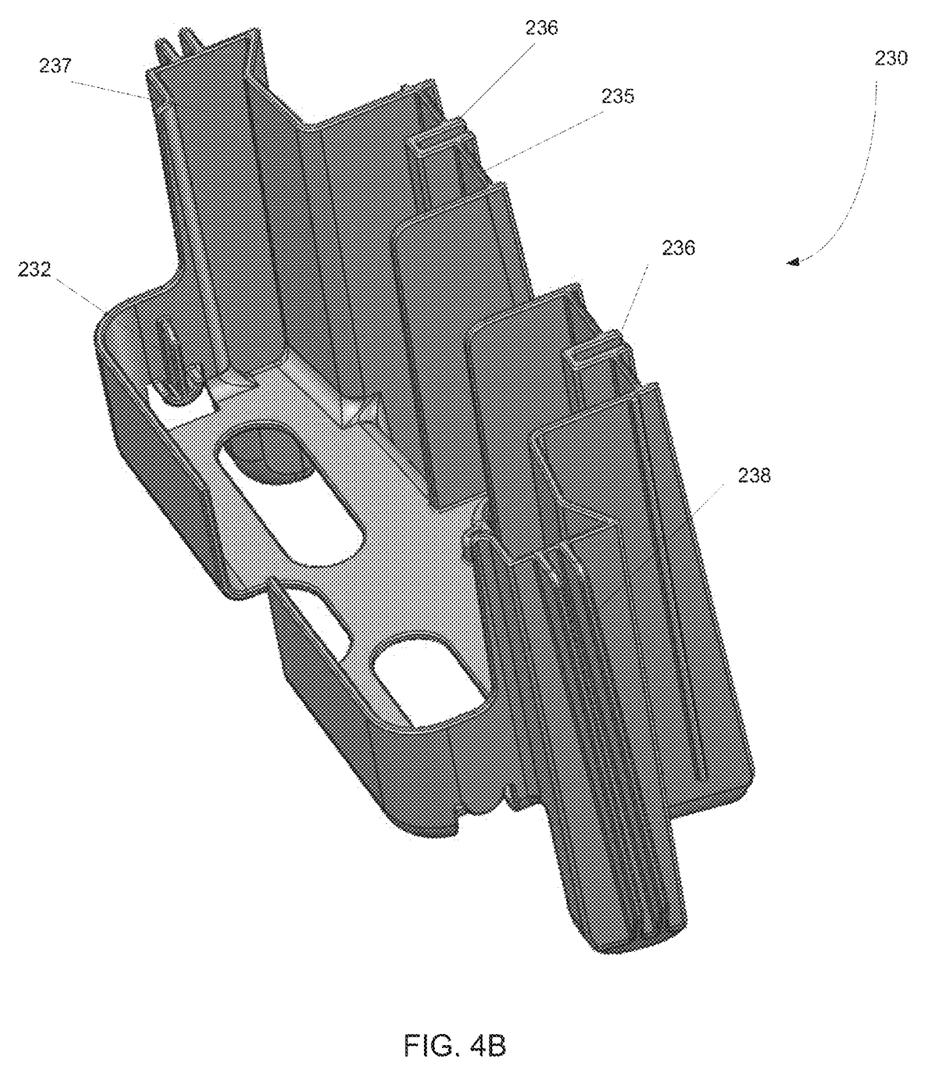

FIGS. 4A-B show various views of the mounting frame 230. As noted above, the mounting frame 230 is disposed in the underside of the base plate 100 and is used to provide support for the shaft 210. Thus, the mounting frame 230 comprises a passageway 231, and mounting members 232 for attachment to the base 10. In one embodiment, the mounting members 232 are designed to be press fit into corresponding openings or holes in the base plate 100. In some embodiments, the shape of the mounting frame 230 may be such so as to conform to the shape of the underside of the base plate 100.

In this embodiment, the adjustable foot 240 fits over and is slidingly attached to the mounting frame 230. A front wall 235 of the mounting frame 230 provides support to the adjustable foot 240, such that a wall of the adjustable foot 240 is disposed in a gap between a wall on the underside of the base plate 100 and the front wall 235 of the mounting frame 230. The adjustable foot 240 slides and extends away from the lower surface 110 of the base plate 100 along a single plane using a guide mechanism. As shown in FIGS. 4A-B, the guide mechanism comprises one or more vertical recesses 236 formed in the front wall 235. The vertical recesses 236, which are intended to serve as tracks, are placed in communication with corresponding protrusions or rails 243 disposed on the inner surface of the adjustable foot 240 (as shown in FIG. 5). In some embodiments, the mounting frame 230 further includes sidewalls 237, such that a wall of the adjustable foot 240 is disposed in a gap between a wall on the underside of the base plate 100 and the sidewalls 237. Further, the guide mechanism may further comprise one or more vertical recesses 238 disposed on the sidewalls 237 of the mounting frame 230 to accommodate protrusions (e.g., rails 243 as shown in FIG. 5) disposed on the inner surface of the adjustable foot 240.

FIGS. 4A-4B show one embodiment of the mounting frame 230. However, other embodiments are within the scope of the disclosure. For example, the shape of the mounting frame 230 may be modified to accommodate the underside of the base plate 100 and may look different than the embodiment shown in the figures. The mounting frame 230 may have an attachment mechanism, such as mounting members 232, which attach the mounting frame 230 to the underside of the base plate 100. The mounting frame 230 may also include a passageway 231 through which the shaft 210 passes and is held in place. The mounting frame 230 may also have a guide mechanism, such as the vertical recesses 236, 238, which serve to provide a mechanism by which the adjustable foot 240 can be slid into and out of the cavity in the base plate 100. Thus, the shape and structure of the mounting frame 230 can be varied, while including one or more of these features in the structure.

In another embodiment (not shown), there is no separate mounting frame 230. Rather, the structure described herein, namely the passageway 231 and a guide mechanism (e.g., the vertical recesses 236, 238) may be molded and integrally formed into the base plate 100. However, in both embodiments, a passageway 231 and a guide mechanism may be provided to accommodate a shaft 210 and an adjustable foot 240.

As described above, in this embodiment the adjustable foot 240 fits over the mounting frame 230 within the cavity in the base plate 100. The adjustable foot 240 may have a closed end, which extends away from the base plate 100, and is used to support the base 10 when placed on a vehicle seat. The opposite end of the adjustable foot 240 may be open to reveal an inner surface. FIG. 5 shows a view of the inner surface of the adjustable foot 240. The adjustable foot 240 includes a height adjustment rack 245 that comprises a plurality of locking members 241 at different vertical locations along the interior of the adjustable foot 240. The locking members 241 cooperate with the first retaining member 221 of the shaft 210 to hold the adjustable foot 240 at a predetermined height.

While FIG. 5 shows three such locking members 241, the disclosure is not limited to any particular number. The locking members 241 may be integrated into the inner surface of the adjustable foot 240 so as to be an integral part. The locking members 241 may comprise cavities into which the first retaining member 221 may be inserted. These cavities may be cut into the inner surface of the adjustable foot 240. In the embodiment shown in FIG. 5, the locking members 241 include an outward protrusion, the underside of which defines the cavity which interacts with the first retaining member 221.

The inner surface of the adjustable foot 240 also may include one of more blocking members 242. This blocking member 242 may be disposed near the open end of the adjustable foot 240, and may extend away from the inner surface. Its shape may be such that the second retaining member 222 of the shaft 210 interferes with the blocking member 242 as the adjustable foot 240 slides within the cavity formed in the base plate 100. Thus, when a user manipulates the release knob 205 to the first, or unlocked position, and slides the adjustable foot 240 away from the base plate 100, the second retaining member 222 will interfere and come into contact with the blocking member 242, such that the adjustable foot 240 cannot be removed from the base plate 100.

The inner surface of the adjustable foot 240 may include one or more rails 243 which cooperate with the vertical recesses 236, 238 in the mounting frame 230. In this embodiment, the adjustable foot 240 includes the protrusions or rails 243, while the mounting frame 230 includes corresponding vertical recesses 236, 238. However, in another embodiment, the adjustable foot 240 may have recesses, whereas rails 243 are included on the mounting frame 230. In both scenarios, the mounting frame 230 and the adjustable foot 240 utilize a guiding mechanism to allow the adjustable foot 240 to slide in and out of the cavity in the underside of the base plate 100. In other embodiments, the guiding mechanism may comprise ball bearings, wheels, or other suitable mechanisms to allow the adjustable foot 240 to slide away from and towards the lower surface 110 of the base plate 100.

Figure 6A:
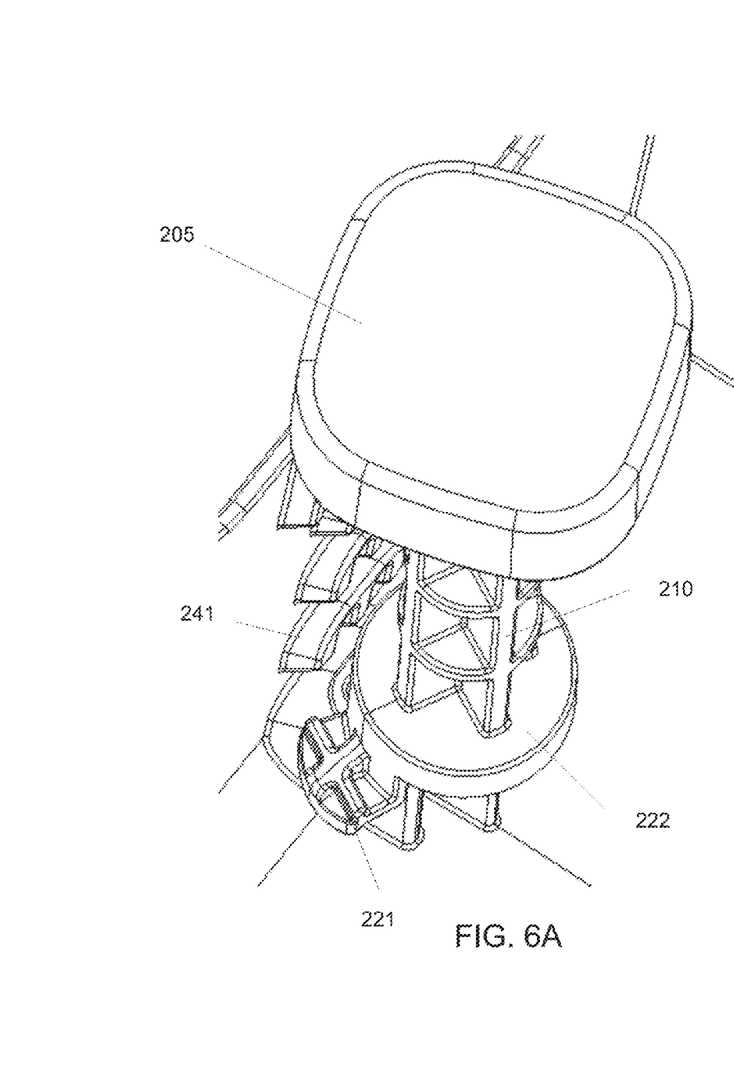
FIGS. 6A-6B show the interaction between the shaft and the adjustable foot.
Figure 6B:
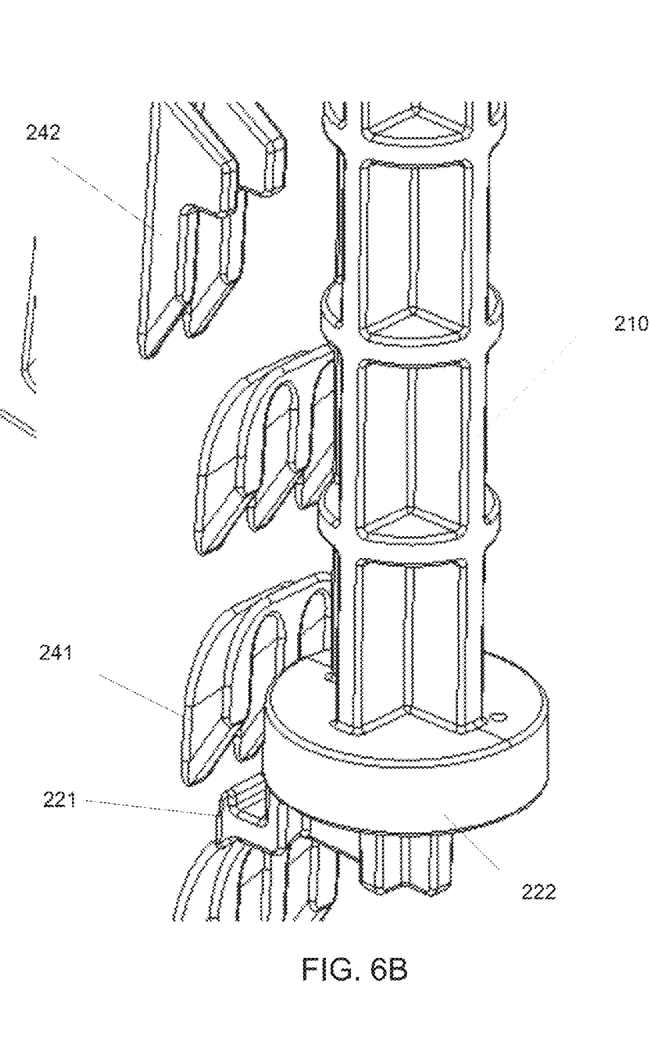

FIGS. 6A-6B further illustrate the interaction with the shaft 210 and the adjustable foot 240. In these views, the mounting frame 230 has been removed for clarity of illustration. Specifically, FIG. 6A shows the shaft 210 rotated such that the first retaining member 221 no longer is in contact with the locking members 241. In this position, the adjustable foot 240 is able to move up and down within the cavity formed in the base plate 100. Its range of motion is limited; in the downward direction, the second retaining member 222 interferes with the blocking member 242, thus inhibiting further movement. In the upward direction, the motion is limited by contact between the bottom of the shaft 210 and the bottom of the adjustable foot 240.

To adjust the height position of the base 10, the following process may be followed. First, the release knob 205 is rotated approximately by a ¼ turn, although other ranges of motion may be used. This rotation disengages the first retaining member 221 from one of the locking members 241. The adjustable foot 240 can now be manually adjusted by pushing it further into the cavity in the base plate 100, or by pulling it away from the base plate 100. Alternately, the adjustable foot 240 may be adjusted simply using gravity assist. When the user has achieved the desired height position, the release knob 205 can then be released. The biasing member 225 automatically returns to its nominal state, thereby causing the shaft 210 to turn back to the locked position, wherein the first retaining member 221 engages with one of the locking members 241. The locking members 241 are positioned such that the rotation of the shaft 210 back to the locked position always serves to engage one of the locking members 241. The existence of multiple locking members 241 allows the foot to be locked in a plurality of height positions.

Figure 7:
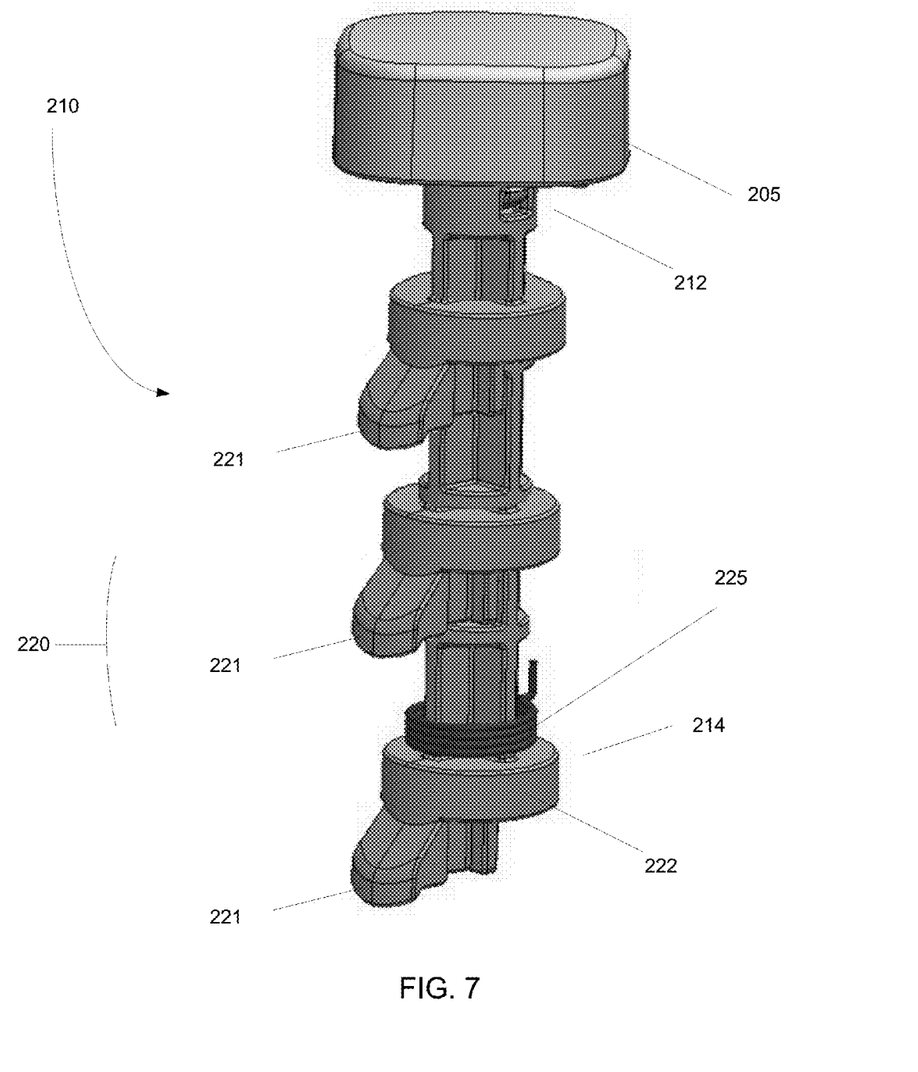
FIG. 7 is a perspective view of a shaft having a plurality of first retaining members according to another embodiment of the disclosure.

While FIGS. 3, 5 and 6 show an adjustable foot 240 having multiple locking members 241 and a single first retaining member 221, other configurations are possible and within the scope of the disclosure. For example, in another embodiment, the one or more retaining members 220 on the shaft 210 may comprise a plurality of first retaining members 221 disposed on the shaft 210 (e.g., as shown in the embodiment of FIG. 7), while only a single locking member 241 is disposed on the inner surface of the adjustable foot 240. In this way, the shaft 210 as opposed to the adjustable foot 240 features a height adjustment rack 245. In this configuration, one of the first retaining members 221 engages with the locking member 241, located on the adjustable foot 240. In either embodiment, there are one or more first retaining members 221 and one or more locking members 241, such that the engagement of the first retaining members 221 and the locking members 241 allow for a plurality of different height positions.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A base for an infant safety seat, adapted to be mounted in a vehicle seat, comprising:
    a base plate having a top surface and an underside adapted to face toward said vehicle seat, wherein a cavity is disposed in said underside; and
    a height adjustment assembly, comprising:
    a release knob accessible from said top surface;
    a shaft having a first end attached to said release knob, and a first retaining member disposed on said shaft; and
    an adjustable foot adapted to be disposed in said cavity and having a locking member on an inner surface;
    wherein said shaft has a locked position wherein said first retaining member cooperates with said locking member to hold said adjustable foot in a first height position, and a second rotated position wherein said first retaining member does not contact said locking member.

2. The base for an infant safety seat of claim 1, further comprising one or more additional locking members disposed on said inner surface, wherein said locking members allow said foot to be held in a variety of height positions.

3. The base for an infant safety seat of claim 1, further comprising one or more additional first retaining members disposed on said shaft, wherein said first retaining members allow said foot to be held in a variety of height positions.

4. The base for an infant safety seat of claim 1, further comprising a second retaining member disposed on said shaft and a blocking member disposed on said foot, such that said blocking member and said second retaining member cooperate to retain said foot on said base.

5. The base for an infant safety seat of claim 1, further comprising a mounting frame affixed to said underside of said base plate, said mounting frame comprising a passageway through which said shaft passes.

6. The base for an infant safety seat of claim 5, wherein said mounting frame comprises a front wall and wherein a wall of said foot is disposed in a gap between a wall on said underside of said base plate and said front wall.

7. The base for an infant safety seat of claim 6, wherein said front wall comprises a guide mechanism to allow said foot to move in said gap.

8. The base for an infant safety seat of claim 7, wherein said guide mechanism comprises a vertical recess, and said inner surface of said foot comprises a rail adapted to fit in said recess.

9. The base for an infant safety seat of claim 1, further comprising a biasing member disposed on said shaft, wherein said biasing member is configured to bias said shaft to said locked position.

10. A base for an infant safety seat, adapted to be mounted in a vehicle seat, comprising:
    an upper surface adapted to carry a car seat carrier;
    a lower surface adapted to be placed on a vehicle car seat; and a height adjustment assembly comprising a height adjustment rack, an actuator, a release button accessible from the upper surface, and an adjustable foot extending from the lower surface;

wherein the actuator releasably engages the height adjustment rack at different vertical locations along the height adjustment rack, such that the adjustable foot may move with respect to the lower surface of the base;

wherein rotating the release button causes the actuator to releasably engage the height adjustment rack at different vertical locations along the height adjustment rack.

11. The base for an infant safety seat of claim 10, wherein the actuator is in communication with the release button.

12. The base for an infant safety seat of claim 10, wherein the height adjustment rack comprises a plurality of locking members, and the actuator further comprises at least one retaining member configured to releasably engage with at least one of said plurality of locking members.

13. The base for an infant safety seat of claim 10, wherein the height adjustment rack is formed on an inner surface of the adjustable foot.

14. The base for an infant safety seat of claim 10, wherein the actuator comprises a shaft having one or more retaining members configured to releasably engage with the height adjustment rack.

15. The base for an infant safety seat of claim 10, wherein the height adjustment assembly further comprises a guiding mechanism configured to allow the adjustable foot to move with respect to the lower surface of the base along a single plane.

16. The base for an infant safety seat of claim 10, wherein the height adjustment assembly is disposed at least in part within a cavity in the lower surface of the base.

17. The base for an infant safety seat of claim 10, further comprising a biasing member in communication with the actuator, wherein the biasing member biases the actuator to be engaged with the height adjustment rack.

18. The base for an infant safety seat of claim 10, wherein the adjustable foot is prevented from disengaging from the height adjustment mechanism by a blocking member in communication with a second retaining member.

19. A base for an infant safety seat, comprising:
an upper surface adapted to carry a car seat carrier;
a lower surface adapted to be placed on a vehicle car seat and having a cavity formed therein; and
a height adjustment assembly disposed at least in part within the cavity formed in the lower surface, the height adjustment assembly comprising:
an adjustable foot extending from the lower surface and having a height adjustment rack comprising a plurality of locking members;
an actuator comprising a shaft, said shaft having one or more retaining members; and
a release button coupled to the actuator and accessible from the upper surface;
wherein rotating the release button causes the one or more retaining members to releasably engage with at least one of the plurality of locking members at different vertical locations along the height adjustment rack, such that the location of the adjustable foot with respect to the lower surface may be adjusted and locked in place.

* * * * *